United States Patent Office 2,773,073
Patented Dec. 4, 1956

2,773,073

CYCLOPENTANOPHENANTHRENE COMPOUNDS AND METHOD FOR PREPARATION THEREOF

George Rosenkranz, Mexico City, Mexico, and Carl Djerassi, Birmingham, Mich., assignors, by mesne assignments, to Syntex S. A., Mexico City, Mexico, a corporation of Mexico No Drawing. Application September 22, 1952, Serial No. 310,934

Claims priority, application Mexico October 8, 1951

3 Claims. (Cl. 260—397.3)

The present invention relates to cyclopentanophenanthrene compounds and to a novel method for the preparation thereof. More particularly, the present invention relates to a method for the preparation of allopregnan-3,11,20-trione by degradation of 22-isoallospirostan-3,11-dione.

Allopregnan-3,11,20-trione was first obtained and described by Steiger and Reichstein (Helv. Chim. Acta, 21,161 (1938)), who prepared this compound by degradation of corticosterone. Since this last-mentioned compound possesses a keto group in position 11 of the molecule, it represents a potentially valuable intermediate for the synthesis of cortisone and the present method which produces allopregnan-3,11,20-trione, therefore, provides a new path for the synthesis of cortisone.

In United States patent application Serial Number 306,512 of Djerassi and Rosenkranz, filed August 26, 1952, a method is disclosed for the preparation of 22-isoallospirostan-3,11-dione by the oxidation of 3β,11α-dihydroxy sapogenins.

In accordance with the present invention, it has been discovered that this last-mentioned compound, upon treatment with acetic anhydride under pressure, at approximately 200° C., can be converted into the corresponding $\Delta^{20(22)}$-allo-furostene-26-ol-3,11-dione acetate. It has further been discovered in accordance with the present invention, that oxidation with chromic acid of this last-mentioned compound produces $\Delta^{16}$-allopregnene-3,11,20-trione, which can be catalytically hydrogenated to give allopregnan-3,11,20-trione.

The following equation serves to illustrate the present invention:

In the above equation AC represents the residue of acetic acid.

In practicing the reactions above set forth, the sapogenin, i. e. 22-isoallospirostan-3,11-dione, in acetic anhydride is heated in a sealed tube at a temperature of approximately 200° C. for a substantial period of time, as for example eight hours, and is thereafter poured into water. The reaction mixture is then extracted with a suitable organic solvent such as ether and the ether layer is purified as by washing with water, sodium carbonate and again with water until neutral. Thereafter the ether solution is dried over as for example sodium sulfate and evaporated to dryness leaving the $\Delta^{20(22)}$-allo-furostene-26-ol-3,11-dione acetate in the form of a yellow oil. This oil may be utilized without further purification for oxidation with chromic anhydride. For this purpose, the yellow oil may be dissolved in acetic acid with heating or in a mixture of acetic acid ethylene dichloride and water. In either case the solution is cooled to below room temperature, as for example 15° C. and treated dropwise with a solution of chromic anhydride in water and acetic acid. The reaction mixture is then allowed to stand at room temperature for a short period of time, as for example two hours, and then poured into water. If ethylene dichloride is utilized, the ethylene dichloride layer is then separated by decantation. The aqueous layer is then extracted with a suitable solvent such as chloroform, and where ethylene dichloride is utilized, the chloroform and ethylene dichloride extract are combined, washed with water, dried and evaporated to dryness. The residue is then preferably dissolved in a solvent such as benzene and hexane and chromatographed in an alumina column. The fractions eluted with benzene are then combined and evaporated to dryness. After crystallization the product was $\Delta^{16}$-allopregnene-3,11,20-trione.

The $\Delta^{16}$-allopregnene-3,11,20-trione is then dissolved in ethyl acetate and shaken at room temperature and atmospheric pressure in a hydrogen atmosphere in the presence of a suitable hydrogenation catalyst such as palladium on barium sulfate until the absorption of hydrogen ceased. Upon filtration of the catalyst, evaporation to dryness and crystallization, allopregnan-3,11,20-trione was produced.

The following specific examples will serve to illustrate but are not intended to limit the present invention:

*Example I*

A solution of 5 g. of 22-isoallospirostan-3,11-dione

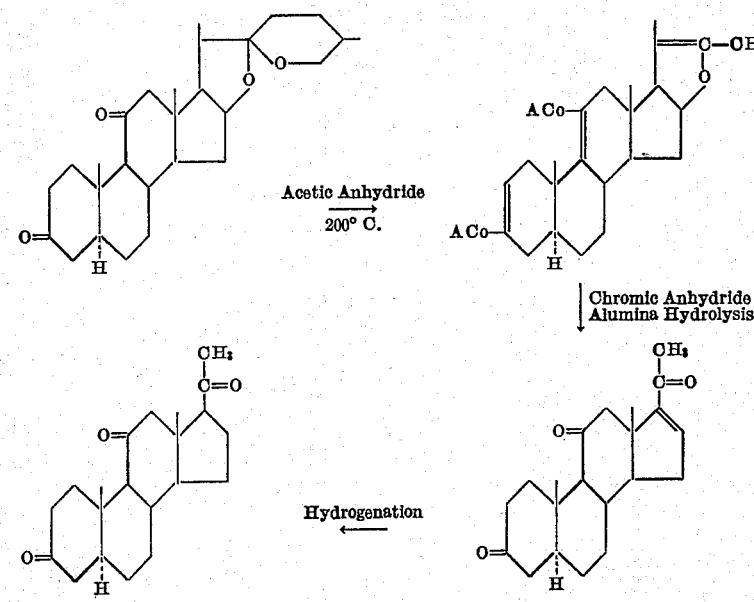

(melting point 236–238° C.) in 20 cc. of acetic anhydride was heated in a sealed tube at 196° C. during eight hours and then poured in water. The mixture was extracted with ether and the ether layer was washed with water, sodium bicarbonate and water until neutral, dried over sodium sulphate and evaporated to dryness, leaving 4.3 g. of $\Delta^{20(22)}$-allo-furostene-26-ol-3,11-dione acetate, in the form of a yellow oil. Without further purification, this oil was dissolved in a mixture of 45 cc. of acetic acid, 35 cc. of ethylene dichloride and 15 cc. of water and heated until all the product had gone into solution. The solution was cooled to 15° C. and treated drop by drop with a solution of 1.4 g. of chromic anhydride in 2.1 cc. of water and 21 cc. of acetic acid. After 2 hours standing at room temperature, the mixture was poured in water and the layer of ethylene dichloride was separated by decantation. The aqueous layer was extracted with chloroform and the combined chloroform and ethylene dichloride extract was washed several times with water, dried over sodium sulfate and evaporated to dryness. The residue was dissolved in a mixture of 50 cc. of benzene and 200 cc. of hexane and chromatographed in a column with 150 g. of alumina. The fractions eluted with benzene were combined and evaporated to dryness. The residue crystallized on digesting with ether-pentane to give 1.6 g. of $\Delta^{16}$-allopregnene-3,11,20-trione.

*Example II*

5 g. of 22-isoallospirostan-3,11-dione were treated in exactly the same way as described in Example I. A residue of 4.27 g. of $\Delta^{20(22)}$-allofurostene-26-ol-3,11-dione acetate was obtained. The product was dissolved in 60 cc. of hot acetic acid and then cooled to 15° C. After treatment with 1.4 of chromic anhydride in exactly the same way as described in Example I, 1.52 g. of $\Delta^{16}$-allopregnene-3,11,20-trione were obtained, identical with the one obtained according to Example I.

*Example III*

A solution of 1.5 g. of $\Delta^{16}$-allopregnene-3,11,20-trione in 250 cc. of ethyl acetate was shaken at room temperature and atmospheric pressure in an atmosphere of hydrogen with 250 mg. of 10% palladium on barium sulfate catalyst until the absorption of hydrogen ceased. This point was reached after approximately 50 minutes. The catalyst was filtered and the solution was evaporated to dryness. The residue crystallized from hexane-acetone to yield 1.29 g. of allopregnan-3,11,20-trione, melting point 212–214° C. The product showed no selective absorption in the ultraviolet spectrum.

Although the foregoing examples and method have been illustrated with compounds of the 5-allo type, the present reaction is equally applicable to compounds of the 5-normal type. And where in the subsequent claims the term "spirostan," "furostene" and/or "pregnene" and/or "pregnane" is utilized, these terms include either the normal or allo compounds.

We claim:

1. A method for the preparation of pregnane-3,11,20-trione compounds, which comprises treating spirostan-3,11-dione compounds with acetic anhydride under pressure and at a temperature of approximately 200° C., thereafter oxidizing the $\Delta^{20(22)}$-furostene-26-ol-3,11-dione acetate formed with chromic anhydride followed by hydrolysis with alumina to produce the corresponding $\Delta^{16}$-pregnene compound, and thereafter hydrogenating the $\Delta^{16}$-pregnene-3,11,20-trione in the presence of a palladium hydrogenation catalyst.

2. The method of claim 1 wherein the spirostan-3,11-dione compound is 22-isoallospirostan-3,11-dione and the final product is allopregnan-3,11,20-trione.

3. A process for the production of $\Delta^{16}$-allopregnene-3,11,20-trione which comprises oxidizing with chromic anhydride followed by hydrolysis with alumina $\Delta^{20(22)}$-allofurostene-26-ol-3,11-dione acetate.

References Cited in the file of this patent

UNITED STATES PATENTS

| 2,352,852 | Marker | July 4, 1944 |
| 2,395,338 | Marker | Feb. 19, 1946 |
| 2,408,828 | Wagner | Oct. 6, 1946 |

OTHER REFERENCES

Marker: JACS, vol. 69, pp. 2167–73 (1947).

Chamberlain: JACS, August 1951, vol. 73, pp. 2396–97, rec'd Apr. 26, 1951.